March 25, 1930.  W. B. NANCE  1,751,877
DRAIN TRAP
Filed May 10, 1929
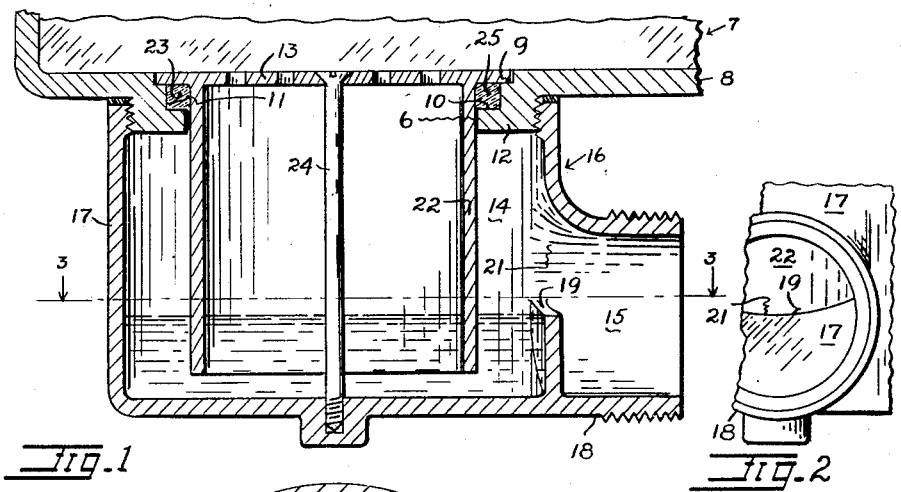
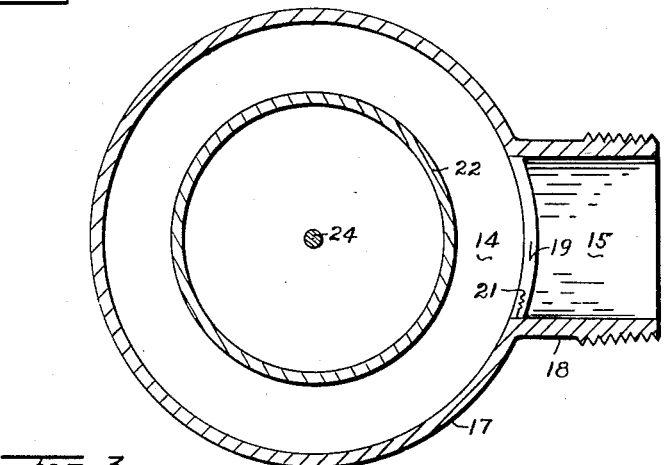
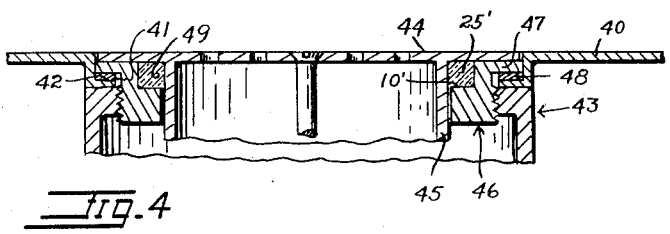
INVENTOR.
William B. Nance
BY M. C. Frank
ATTORNEY.

Patented Mar. 25, 1930

1,751,877

UNITED STATES PATENT OFFICE

WILLIAM B. NANCE, OF SAN LEANDRO, CALIFORNIA

DRAIN TRAP

Application filed May 10, 1929. Serial No. 362,071.

The invention relates to a drain trap for sinks and the like, and to means for mounting the trap on a sink.

A major object of the invention is to provide a trap of the class described which is adapted to be cleaned from within the sink and without disturbing the drainpipe of the sink or requiring expert plumbing knowledge.

Another object is to provide an improved mounting means for a trap of the class described.

A further object of the invention is to provide in a trap of the class described a new correlation of parts whereby marked economies in manufacture will be effected.

The invention possesses other objects and features of advantage, some of which, with the foregoing, will be set forth or be apparent in the following description of a preferred form of the invention which is illustrated in the accompanying drawings, in which:

Figure 1 is a vertical axial section through a mounted trap embodying the invention.

Figure 2 is a fragmentary view taken at right angles to the view of Figure 1 and looking into the outlet pipe of the trap.

Figure 3 is a plan sectional view at 3—3 in Figure 1.

Figure 4 is a fragmentary view similar to Figure 1 and showing an alternative mounting means for the trap structure.

The trap of my invention is arranged to be used at the drain outlet of any vessel for liquids where a liquid seal against a return flow of sewer gases is desired. As particularly disclosed in Figure 1, a trap embodying the invention is mounted at the drain aperture 6 of a vessel 7, said vessel being hereinafter referred to as a sink; it is not intended, however, to thereby limit the use of the trap to a kitchen sink, for the use of the word sink is intended as generic to a large class of drained receptacles. In the present instance, the sink 7 is of a cast structure and the bottom 8 thereof is thickened at and around the aperture to provide a stepped aperture bore having upper and lower seats 9 and 10 of similar outline but different peripheral lengths, the lower seat 10 being peripherally shorter and lying inwardly of and below the seat 9. As particularly shown the aperture 6 is circular whereby the seats 9 and 10 are annular, a cylindrical bore portion 11 connects the seats, and a depending annulus 12 is defined by the sink bottom portion providing said seats. A strainer plate 13 is provided for engagement in the upper seat 9, said plate being interiorly perforated in a usual manner.

A chamber 14 is defined beneath the aperture 6, said chamber having an outlet passage 15 from a side thereof and above its bottom whereby liquid is arranged to be retained in the bottom portion of the chamber at all times. As shown, the chamber 14 and outlet passage 15 are defined in a body member 16 providing a cup-like receptacle portion 17 and an integral pipe portion 18 extending radially from the portion 17 to provide the outlet passage 15. The top edge of the receptacle 17 is arranged to be fixed to the depending annulus 12 of the sink bottom in sealed relation thereto; in the present embodiment, a threaded engagement of the receptacle and annulus is provided, it being noted that the member 16 might be cast integral with or welded to the annulus 12 for effecting its desired fixed and sealed engagement therewith. Threads are provided at the outer end of the pipe portion 18 whereby the same may be connected to a drain pipe (not shown).

As particularly shown, the receptacle 17 is cylindrical and the pipe 18 extends radially therefrom adjacent the bottom thereof. To retain a desired depth of liquid in the bottom of the chamber 14, the receptacle wall is perforated at a point thereof above the receptacle bottom and opposite the bore of the pipe 18. Preferably, and as shown, the bottom edge 19 of the outlet opening 21 thus provided extends substantially diametrically across the inner end of the pipe 18 and is longitudinally curved downwardly to its center whereby a maximum liquid flow will occur over its center portion. With the structure shown, the receptacle wall portion below the edge 19 is seen to function as a weir with respect to the flow of liquid from the receptacle.

Liquid is arranged to be delivered from the sink drain aperture 6 into the receptacle 17 through a tubular member 22, the strainer plate openings all lying opposite the upper end of the bore of said member whereby it comprises a primary discharge pipe for the liquid from the sink. The outlet of the pipe 22 is somewhat below the level of the weir edge 19 of the outlet opening 21 whereby a liquid seal is provided between the pipes 22 and 18 by means of the liquid retained at the bottom of the receptacle 17. As particularly disclosed, the walls of the pipe 22 are imperforate whereby the outlet of said pipe is at its extreme lower edge. It is noted that the seal head provided is measured by the difference in level between the discharge opening of the pipe 22 and the retained liquid in the receptacle, and that the proportions of the present device might be so varied as to provide any desired seal head without departing from the spirit of the present invention.

Preferably, and as shown, the pipe 22 depends axially into the chamber 14 to define an annular chamber portion thereabout. Since the said chamber portion constantly communicates with the pipe 18 through the opening 21 and the escape of sewer gases is to be prevented, it must have no outlets therefrom other than said opening, unless a local vent is provided, the latter not being shown in the present instance. It is therefore necessary to provide a seal of said chamber portion at the aperture 6 of the sink bottom, and the trap structure and relations thereat will now be described. As particularly disclosed, the pipe 22 is integral with the strainer plate 13 and closely but removably fits the aperture bore portion below the seat 10. In this manner, the outside of the pipe 22, the bottom of the plate 13, the bore portion 11, and the seat 10 cooperate to define an annular space 23 about the pipe 22 when the plate engages the seat 9. A screw bolt 24 extends through and depends from the strainer plate for engagement with the bottom of the receptacle for clamping the plate to the seat 9, the space 23 being first filled with a soft and resilient packing 25 whereby, when the plate is seated, the pipe 22 is exteriorly sealed in the aperture 6 and the outer chamber portion is sealed thereat. The packing 25 is also seen to seal the stepped seat provided beneath the strainer plate 13 whereby all required seals are provided by said packing.

It will now be clear that when the trap is in use, the bottom of the chamber 14 provides a settling basin for heavier particles of refuse and at the same time a proper gas seal is provided thereat and thereby. For cleaning the present trap, it is merely necessary to release the bolt 24, and lift out the strainer plate 13 and pipe 22 whereby the entire interior of the receptacle 17 is accessible for cleaning.

In Figure 4, a means is disclosed for mounting a structure embodying the features of the previously described trap on a standard sink of pressed metal or the like provided with an apertured bottom 40, the aperture 41 of said bottom having a single depressed seat 42 provided therearound. A member 43 is provided, said member being formed generally as the member 16 of the first described embodiment. A strainer plate 44 carrying a discharge pipe 45 is also provided for disposal at the aperture. To effect the mounting of the members 43, 44 and 45 at the aperture, an adapter ring 46 is provided having an upper radial flange portion 47 for bearing engagement with the seat 42, a sealing gasket 48 being preferably interposed between the flange 47 and the seat 42. The bore of the ring 46 is stepped to provide a seat 10' corresponding to the seat 10 of the other embodiment, and the top of the ring 46 is arranged to receive the edge of the strainer plate 44. An annular space 49 is seen to be defined about the pipe 45 and above the seat 10' for the reception of packing 25'. A depending adapter ring portion is arranged to threadedly receive the upper end of the member for clamping the ring in its place. It is noted that the present mounting may also be used at an aperture providing no depressed seat thereat. A structure embodying the before described trap device and provided with the mounting means now described is seen to be adapted for mounting at sinks and the like in lieu of, or in addition to, present S-traps without requiring a special sink bottom structure, as in the first described embodiment.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claim.

Having thus described my invention, I claim as new and desire to secure by Letters Patent of the United States the following:

In a sink, a drain aperture, a seat for a strainer plate at said aperture, a strainer plate engaging said seat, a tubular discharge member depending from the aperture, a member mounted beneath the sink and providing a chamber enclosing said first member and having a side outlet above the bottom thereof, a sealing member for sealing said plate in its seat and to exteriorly seal said tubular member in said aperture, and tension means cooperative between the strainer plate and second member to releasably secure the said plate and member in their operative positions with respect to the aperture.

In testimony whereof, I affix my signature.

WILLIAM B. NANCE.